United States Patent [19]

Shridharani

[11] Patent Number: 5,422,420
[45] Date of Patent: * Jun. 6, 1995

[54] TERPOLYAMIDES AND MULTIPOLYAMIDES CONTAINING AMIDE UNITS OF 2-METHYLPENTAMETHYLENEDIAMINE AND PRODUCTS PREPARED THEREFROM

[75] Inventor: Ketan G. Shridharani, Camden, S.C.

[73] Assignee: E. I. Du Pont de Nemours and Company, Wilmington, Del.

[*] Notice: The portion of the term of this patent subsequent to Mar. 1, 2011 has been disclaimed.

[21] Appl. No.: 50,420

[22] PCT Filed: Nov. 18, 1991

[86] PCT No.: PCT/US91/08385

§ 371 Date: May 19, 1993

§ 102(e) Date: May 19, 1993

[87] PCT Pub. No.: WO92/08754

PCT Pub. Date: May 29, 1992

Related U.S. Application Data

[63] Continuation-in-part of Ser. No. 755,715, Sep. 6, 1991, abandoned, which is a continuation-in-part of Ser. No. 616,126, Nov. 20, 1990, Pat. No. 5,223,196.

[51] Int. Cl.$^6$ ............... C08G 69/26; C08G 73/10
[52] U.S. Cl. .................... 528/349; 528/321; 528/324; 528/331; 528/337; 528/338; 528/339; 528/340; 528/347; 428/394; 428/395; 525/432
[58] Field of Search ............... 528/349, 347, 337, 338, 528/339, 340, 324, 331, 321; 525/432; 428/394, 395

[56] References Cited

U.S. PATENT DOCUMENTS

| | | | |
|---|---|---|---|
| 2,252,554 | 8/1941 | Carothers | 528/338 |
| 3,542,743 | 11/1970 | Flamand | 528/335 |
| 3,565,910 | 2/1971 | Elbert et al. | 524/88 |
| 3,583,949 | 6/1971 | Simons | 528/324 |
| 3,621,089 | 11/1971 | Edgar et al. | 264/211 |
| 3,629,053 | 12/1971 | Kimura et al. | 161/173 |
| 3,640,942 | 2/1972 | Crampsey | 524/538 |
| 3,696,074 | 10/1972 | Tsuda et al. | 528/338 |
| 3,787,373 | 1/1974 | Ridgway et al. | 528/324 |
| 3,846,507 | 11/1974 | Thomm et al. | 528/337 |
| 3,926,924 | 12/1975 | Edgar et al. | 528/324 |
| 4,218,509 | 8/1980 | Edgar et al. | 528/339 |
| 4,579,762 | 4/1986 | Ucci | 428/95 |
| 5,110,900 | 5/1992 | Hammond, Jr. et al. | 528/340 |
| 5,137,666 | 8/1992 | Knox et al. | 264/103 |
| 5,162,491 | 11/1992 | Hammond, Jr. et al. | 528/349 |
| 5,185,428 | 2/1993 | Hammond, Jr. et al. | 528/340 |
| 5,194,578 | 3/1993 | Anton | 528/349 |
| 5,290,850 | 3/1994 | Shridharani et al. | 528/340 |

FOREIGN PATENT DOCUMENTS

| | | |
|---|---|---|
| 0035051 | 9/1981 | European Pat. Off. |
| 193023 | 9/1986 | European Pat. Off. |
| 0373655 | 6/1990 | European Pat. Off. |
| 0408474 | 1/1991 | European Pat. Off. |
| 0411774A1 | 2/1991 | European Pat. Off. |
| 2355043 | 1/1978 | France |
| 61-63785 | 4/1986 | Japan |
| 63-145415 | 6/1988 | Japan |
| 918637 | 2/1963 | United Kingdom |
| 1249730 | 10/1971 | United Kingdom |
| 1526329 | 9/1978 | United Kingdom |

Primary Examiner—John Kight, III
Assistant Examiner—P. Hampton-Hightower

[57] ABSTRACT

Polyamides and polyamide fibers having a major proportion of hexamethyleneadipamide units and minor proportions of at least two other amide units, one of those other amide units being those of 2-methylpentamethylenediamine are disclosed.

12 Claims, No Drawings

TERPOLYAMIDES AND MULTIPOLYAMIDES CONTAINING AMIDE UNITS OF 2-METHYLPENTAMETHYLENEDIAMINE AND PRODUCTS PREPARED THEREFROM

The present invention is a continuation-in-part of application Ser. No. 07/755,715, filed Sep. 6, 1991, now abandoned, which is a continuation-in-part of application Ser. No. 07/616,126, filed Nov. 20, 1990, now U.S. Pat. No. 5,223,196.

FIELD OF THE INVENTION

The present invention relates to polyamides and more particularly to terpolyamides and multipolyamides having a major proportion of hexamethyleneadipamide units and minor proportions of at least two other amide units, one of these other amide units being those of 2-methylpentamethylenediamine. It also relates to products, particularly fiber products, formed from such ter- and multipolyamides.

BACKGROUND OF THE INVENTION

Poly(hexamethyleneadipamide), commonly known as nylon 6,6, is used in various forms to manufacture a wide variety of useful products. In particular, nylon 6,6 can be spun into fibers for use in many different applications, including carpets, rugs, upholstery, apparel, sewing-thread, and heavy-duty industrial fabrics, to name but a few. There are, however, several disadvantages associated with making and using nylon 6,6 polymer and fibers, particularly as compared to the other common polyamide, poly($\epsilon$-caproamide) or nylon 6. Among these are the lower dye rate of nylon 6,6 and its tendency to develop spherulites which make both the polymer and the fiber cloudy rather than clear. In addition, nylon 6,6 is thermally unstable at normal processing temperatures. When kept in the molten state at processing temperatures for a long time, the polymer forms branched or crosslinked, insoluble, nonfusible gel. The formation of gel in the polymer product and on the walls of processing equipment can result in deficient product with poor processability, particularly when fiber spinning is involved. The fiber spinning breaks which may occur due to gel formation are troublesome and make the winding of large packages impractical.

Various approaches to overcoming each of these disadvantages have been identified. U.S. Pat. No. 4,559,196, for example, provides for room-temperature dyeability by steam-setting a random copolymer of nylon 6,6 and nylon 6 wherein the nylon 6 constitutes 6–12% of the copolymer. U.S. Pat. No. 4,919,874 discloses a nylon 6,6/6 copolymer fiber having reduced spherulites made by polymerizing nylon 6,6 salt with 1–6% -caprolactam and up to 2% of an inorganic calcium salt. U.S. Pat. No. 3,872,055 reports polyamide compositions having decreased gel-formation wherein the polyamides are copolyamides of the diamine-dicarboxylic acid type containing phosphinic and phosphonous acid compounds together with an alkali metal compound.

Modified nylon 6,6 polymers having a combination of properties which minimize or eliminate such disadvantages would be highly desirable.

SUMMARY OF THE INVENTION

In accordance with the invention, there is provided a polyamide comprising between about 80 and about 99 mole percent hexamethyleneadipamide units and between about 0.5 and about 10 mole percent each of at least two other amide units, one of said other units being units of 2-methylpentamethylenediamine (hereinafter sometimes referred to as "Me5").

In a preferred form of the invention, the polyamide comprises between about 90 and about 99 mole percent hexamethyleneadipamide units and between about 0.5 and about 5 mole percent of both the Me5 units and each of the other amide units. The amide units other than those of Me5 are preferably selected from the group consisting of amide units of isophthalic acid, terephthalic acid, 5-sulfoisophthalic acid and salts thereof, dodecanedioic acid, m-xylenediamine, and $\epsilon$-caprolactam.

In flake form, the polyamides of this invention typically have relative viscosity (RV) values between about 15 and 45 and melting points ranging from about 215° C. to levels just below 257° C., the melting point of nylon 6,6 homopolymer. When made in a continuous polymerization process, polymer RV can increase to about 80, and when spun into fibers RV will range from about 40 to about 90, with the range of 60 to 80 being most preferred.

As will be described in more detail hereinafter, the ter- and multipolyamides of the invention exhibit reduced spherulite levels and consequently greater optical clarity as compared to both nylon 6,6 homopolymer and various nylon 6,6 copolymers. They also inhibit gel formation, thereby resulting in increased process continuity and lower equipment maintenance costs beyond those associated with reduced spherulite levels.

There are several advantages to the fibers produced from the polymers of the invention. First, the reduced spherulite formation and increased gelation time mentioned above with respect to polymer formation provide further advantages in spinning continuity and in drawing, the fibers. Secondly, fibers made from these ter- and multipolyamides have improved physical properties, i.e. tenacity, and elongation at break, relative to nylon 6,6. Thirdly, by incorporating other amide units in addition to those of Me5 into the nylon 6,6 polymer matrix, desired property improvements can be obtained with reduced amounts of additional amide-forming co-monomers compared to when the nylon 6,6 polymer is modified with only one comonomer.

A further advantage of incorporating other amide units in addition to those of Me5 into the nylon 6,6 polymer matrix is that the fiber producer can selectively produce fibers having various other desirable properties. Fibers having amide units of both isophthalic acid and Me5, for example, exhibit deep dyeability with large or bulky dye molecules such as those used in premetallized dyes. The dye rate of these fibers is also significantly higher than that of corresponding nylon 6,6 copolymer fibers. By combining amide units of 5-sulfoisophthalic acid or its salts with those of Me5, as a different example, the stain resistance of the fibers is enhanced.

DETAILED DESCRIPTION OF THE INVENTION

As used herein the term "amide-forming moiety" refers to the radical of a diacid, diamine, or lactam. For example, the amide-forming moieties of nylon 6,6 are —(HN—$(CH_2)_6$—NH)- derived from the monomer hexamethylene-diamine and —(OC—$(CH_2)_4$—CO)- derived from the monomer adipic acid. As also used herein the term "hexamethyleneadipamide units" refers to the nylon 6,6 units formed by the reaction of the monomers hexamethylenediamine and adipic acid. Similarly, "amide units of 2-methylpenta-methylenediamine" are the recurring units formed by the reaction of that diamine with an acid end-group, such as those of diacids and lactams. The term "interpolyamide" is used generically to refer to polyamides comprised of two or more different recurring amide units, and consequently having at least three different amide-forming moieties as part of the polymer chain. Such polyamides would include any random polyamide formed by polymerizing the nylon 6,6 forming monomers hexamethylenediamine and adipic acid with one or more different polyamide-forming monomers. The term "copolymer" (or "copolyamide") is used to describe the limited group of interpolymers (interpolyamides) formed from only three different amide-forming moieties. When such moieties are derived from the nylon 6,6 forming monomers and a second diamine or diacid, the reaction product will be a copolymer having two different recurring amide units. When the moieties are derived from the nylon 6,6 forming monomers and a lactam, the number of recurring amide units increases to four, due to the bifunctional nature of the lactam, but there remain only three moieties. The term "terpolymer" (or "terpolyamide") refers to polymers (polyamides) having three or more different recurring amide units, but only four different amide-forming moieties. An example of a nylon 6,6 terpolymer would be the reaction product of the nylon 6,6 forming monomers with two different comonomers such as isophthalic acid and Me5. The term "multipolymer" (or "multipolyamide") refers to polymers (polyamides) comprised of more than four different recurring units and more than four amide-forming moieties. The term "block polymer" or "block polyamide" refers to a polymer obtained by co-melting and then further processing together two or more different polymers to form blocks containing the recurring amide-forming moieties of each of the different polymers.

Since various combinations of repeating units exist when two or more diamines and one or more diacids are incorporated into a polymer, hereinafter polymers will, for simplicity, often be described by referring only to the monomeric units. For instance, the polyamide made with hexamethylenediamine, adipic acid, dodecanedioic acid (DDDA), and Me5 is in actuality 6,6/6,12/Me5,6-/Me5,12 polymer. However, for simplicity, it will be described herein as 6,6/Me5/DDDA. In view of the various combinations of amide repeating units found in these ter- and multipolyamides, mole percentages as used herein are for convenience calculated based on moles of the monomeric components. For example, the terpolymer formed by reacting nine moles of adipic acid, nine moles of hexamethylenediamine, one mole of 2-methylpentamethylenediamine, and one mole of dodecanedioic acid is considered to have one of twenty, or 5 mole percent, of amide units of 2-methylpentamethylene-diamine, an equivalent mole percentage of amide units of dodecanedioic acid, and 90 mole percent hexamethylene-adipamide units. Similarly, a block terpolyamide made by co-melting the equivalent of nine moles of hexamethylene-adipamide units (i.e. that amount of polymer formed by reacting nine moles of adipic acid with nine moles of hexamethylenediamine) with the equivalent of one mole of poly(2-methylpentamethylene-dodecamide) (i.e. that amount formed by reacting one mole of Me5 with one mole of DDDA) would also be described as having 5 mole percent of the amide units of both Me5 and DDDA and 90 mole percent hexamethyleneadipamide units.

The 2-methylpentamethylenediamine amide units can be formed from Me5 and adipic acid or from Me5 and other diacids, with isophthalic acid, terephthalic acid, 5-sulfoisophthalic acid and its salts, and dodecanedioic acid being preferred.

Any amide-forming additive, including aliphatic, aromatic, and alicyclic diacids and diamines as well as lactams, can be used to form the other amide units which together with the amide units of Me5 are incorporated into the ter- and multipolyamides of this invention. The preferred amide units, however, are those of isophthalic acid, terephthalic acid, 5-sulfoisophthalic acid and the salts thereof, dodecanedioic acid, m-xylenediamine, and -caprolactam. The sodium salt of 5-sulfoisophthalic acid is the preferred additive for providing cationic dyeability (and/or resistance to staining by acid dyes) to the polymer.

Particularly preferred are the polyamides having Me5 and isophthalic acid amide units and those having Me5, isophthalic acid, and terephthalic acid amide units. Fibers spun from these ter- and multipolymers exhibit significantly reduced spherulite levels, longer gelation time, excellent tensile properties, and have higher dye rates than nylon 6,6 fibers.

The choice of monomers or polymers used in making any of the polyamides of the invention will be determined by various factors, including for example, the intended end-use, ease of processing and handling, and comparative cost. While most of the work described herein relates to the use of these polyamides in the form of fibers, the polyamides are also useful in non-fiber applications such as films and blow-molded or formed parts.

Depending on the intended end use of the ter- and multipolyamides of the invention, the mole percentages of both the Me5 amide units and the other units being added to the nylon 6,6 polymer may be adjusted. For example, to increase dyeability of fibers produced from a terpolyamide of this invention, quantities as low as 0.5 mole percent each of Me5 amide units and amide units of isophthalic acid are effective. Generally, however, quantities greater than about 10 mole percent of each such other amide unit should be avoided so that the polymer and fibers made therefrom retain their basic nylon 6,6 characteristics.

In preferred form, the different amide units in the polyamides of this invention are randomly distributed throughout the polymer matrix. The polyamides may also, however, be block ter- or multipolymers wherein the hexamethyleneadipamide units, the Me5 units and the other units are present in blocks.

Polymer Formation

The interpolyamides of this invention can be prepared by a variety of polymerization techniques, but condensation polymerization is the preferred method. A particularly convenient method used for making the polyamides of this invention is to provide two or more aqueous salt solutions, one being the nylon 6,6 precursor hexamethylenediammonium adipate and the other(s) being precursor(s) for the different recurring amide unit(s) to be incorporated into the nylon 6,6 polymer chain. Such other salt solutions of the amide-forming additives being used to modify the nylon 6,6 polymer are frequently formed from the modifying comonomer and a balancing amount of a nylon 6,6 monomer. For example, a water solution of Me5 can be neutralized with an equimolar amount of adipic acid to form 2-methylpentamethylenediammonium adipate salt. When forming a modified nylon interpolymer containing amide units of isophthalio acid (I), an equimolar salt of isophthalic acid and hexamethylenediamine in water can be used as an additive salt. These two copolymerizable salts can then be added to the nylon 6,6 salt separately, and then the three salts polymerized together to form a terpolymer of 6,6/Me5/I, one of the polyamides of this invention.

Alternatively, the necessary two amide units other than those of hexamethyleneadipamide can be provided by the same additive salt. Such a salt could be formed, for example, by combining equal molar quantities of isophthalic acid and Me5 to form 2-methylpentamethylenediammonium isophthalate salt. This additive salt can then be combined with nylon 6,6 salt solution and the mixture polymerized to form a terpolyamide of the invention. It can readily be seen that suitable quantities of different salt solutions can be mixed to produce a composite salt solution for the desired final polymer composition.

As a further alternative polymer formation method, the nylon 6,6-forming monomers, the Me5, and the one or more other modifying comonomer(s) used to form the other different recurring amide units can be added in "neat" rather than salt form, before or during the polymerization process. In such cases proper care has to be given to balance the added reactive ends for the optimum polymerization process as well as to maintain the desired end-use properties. A slight imbalance of ends may sometimes be desirable, however, to obtain distinct products, such as the one containing low amine end levels for light dyeing fibers.

In general, any process useful for making nylon 6,6 homopolymer and copolymers can be used for the production of modified polyamides of this invention. This includes both batch and continuous polymerization processes. Furthermore, no equipment modification will typically be required from that used in these standard processes. It is generally necessary, however, to modify such procedures to make sure that the Me5, which is more volatile than hexamethylenediamine, stays in solution long enough to react. 2-methylpentamethylenediamine is commercially available and is sold by E. I. du Pont de Nemours & Co., Wilmington, Del., under the trademark DYTEK A.

It is usually desirable to add various additives for process control and product property control. A variety of catalysts are known for use in polymerizing nylon 6,6 homopolymer such as phenyl phosphonic acid, manganese hypophosphite, etc., and these have been found to be useful in polymerization of interpolyamides described herein. Similarly, a variety of known antifoam agents can be used to control the foaming in the reaction vessel(s), and antioxidants can be used to maintain acceptable dye-light fastness and to protect the polymer against degradation from ultra-violet radiation. The selection of a specific antioxidant system is governed by both the end-use requirement as well as the chemistry of the particular polyamide. One example of such antioxidants are those containing copper, which are well known to provide protection against tenacity loss. If needed, such antioxidants can be introduced during different steps of the process, for instance, before, during, or after polymerization. Other common additives, such as delustrants, antistatic agents and the like, can also be added to the polyamides of this invention as required.

Branching agents such as tris(2-aminoethyl)amine have been shown to be particularly useful when combined with the modified polyamides of the invention in quantities from as little as 0.02 mole percent to 0.5 mole percent. The tris(2-aminoethyl)amine allows fibers spun from the modified polyamides to be drawn at higher draw tensions without a corresponding increase in filament breaks.

A typical example of a batch process consists of a two stage process. During the first stage, hexamethylenediammonium adipate salt, typically at 52 weight percent concentration, is charged into an evaporator. The other amide-forming additives, in their salt forms, such as 2-methylpentamethylenediammonium adipate and hexamethylene diammonium isophthalate for example, are simultaneously charged to the evaporator, and other preferred additives like antifoam agents, catalysts, and antioxidants can be added simultaneously or sequentially. If desirable due to equipment arrangement or for other process reasons, some or all of the additives including the additive salts, can be charged during the second stage.

Under inert atmosphere, this reaction mixture is then heated to the boil under slight pressure to remove the excess water and thus increase its concentration. A slight pressure is desirable to minimize the loss of volatile materials like hexamethylenediamine. Upon reaching the desired concentration, typically in the range of 10 to 30 weight percent water, the reaction mixture is transferred to an autoclave, a high pressure reactor for the second stage of the process. It is at this point that some or all of the additives that are needed in the final product may alternatively be added. The reaction mixture is maintained under an oxygen-free atmosphere to avoid undesirable side reactions such as oxidative degradation.

The reaction mixture is heated to a temperature between 175° and 200° C. while increasing pressure to about 300 PSIA to again minimize loss of volatile organic compounds. This typically takes about an hour and allows formation of oligomers. The temperature is then increased to between 250° and 275° C. depending on the polymer composition. The pressure is then released at a slow rate to bleed off steam and to drive the condensation reaction towards polymerization. While maintaining approximately the same temperature, the reaction mixture is held at a low constant pressure for a sufficient time to obtain the desired extent of reaction. The polyamide is then extruded from the reaction vessel and conveniently chopped and dried to produce flake. The relative viscosity (RV) from the autoclave of both nylon 6,6 homopolymers and of the modified polyamides of this invention can be in the range of 15 to 80, but is generally between 20 and 55.

The polyamide flake thus produced can be spun at the RV it is produced, or it can be further polymerized to a higher RV by conventional solid phase polymerization processes (such as by removing water under an inert gas at controlled temperature and humidity). Alternatively, the RV may also be increased by other means such as by venting off water as the polymer is melted in the extruder prior to spinning.

Polyamides of the invention are also formed by co-melting, such as in a twin-screw extruder, nylon 6,6 homopolymer with appropriate quantities of one or more other polyamides to provide the desired amount of Me5 amide units as well as the other desired amide units. Under such molten conditions, it is well-known that an amide exchange reaction occurs, resulting in the formation of a block interpolymer rather than a molten mixture. This amide-exchange reaction will proceed while the polymers are in a molten state, with the units of the polymer matrix becoming increasingly more random with time. (In some cases, it may even be desirable to not have complete randomization as usually is obtained by the salt-blending process described above.) Using this method, polyamides of the invention can be prepared, for example, by co-melting nylon 6,6 homopolymer with suitable quantities of a polyamide formed from Me5 and isophthalic acid. Alternatively, the Me5 units could first be incorporated into the nylon 6,6 homopolymer to form a copolymer, the copolymer then being comelted with one or more other polyamides such as poly(hexamethyleneisophthalamide) and/or poly(hexamethyleneterephthalamide).

The modified ter- and multipolyamides of this invention may also be colored by conventional techniques, including by pigment addition. Pigment may be added during polymer formation, but when making pigmented fibers it is preferred to add the pigment to the polymer flake as the flake is melted in an extruder in advance of spinning. This is the preferred method of pigment addition because it results in good dispersion, avoids contamination of the autoclave vessel with pigment, and reduces degradation of both the pigment and the polymer.

Spinning

The polyamides of the invention can be spun into fibers using conventional melt-spinning techniques. For instance, the polyamide(s) in flake form is (are) remelted, preferably by using a screw melter type extruder. As described above, other materials including other polyamides and/or pigments, can be added before or during remelt process. It is not necessary, of course, to use this remelt step if a continuous polymerizer is employed to prepare the polyamides.

Following formation of the homogeneous melt or melt-blend, the melt is typically pumped through a transfer line to a metering pump. The metering pump controls the volume of polymer delivered to an extrusion pack consisting of filtration media and spinneret plate. After filtration, the polymer melt, typically at a temperature about 20° to about 60° C. higher than the polymer melting point, is extruded through spinneret orifices into a quench chimney to form filaments that are cooled to a non-tacky state by a cross-flow of gaseous media, usually humidified chilled air of at least 50% relative humidity at 10°-30° C. The filaments may alternatively be cooled by a radial quench unit.

The cooled filaments are converged, typically at the bottom of a quench drawer. A spin finish is applied to the converged filament bundle by using roll applicators or metered finish tip applicators. The filaments are pulled through the quench zone and over the finish applicators by a feeder roll.

Conventional processes and equipment may be used for drawing these fibers. These include both cold drawing at room temperature, hot drawing at 60°-180° C., and both single-stage and multi-stage drawing processes. Some of these techniques are described in U.S. Pat. No. 4,612,150 (DeHowitt) and U.S. Pat. No. 3,311,691 (Good). Also, these modified polyamides can be used in a high speed spinning process without any mechanical draw to obtain high quality feed yarns for use in draw texturing and for warp-drawing. Such high speed spun draw-texturing feed yarns can be spun in a process such as that disclosed in U.S. Reissue 33,059. Thus, the spinning speed of the process can range from very low to very high, i.e. from about 600 yards per minute to in excess of 5000 yards per minute.

In addition to better optical clarity and reduced spherulite levels, the fibers of this invention exhibit increased shrinkage levels. The high shrinkage property of these fibers is advantageous in many cases such as for combining such fibers with regular shrinkage fibers to obtain unique aesthetics and/or higher bulk levels and for providing a higher twist yarn upon heat-setting.

Fibers of this invention can be engineered into essentially any form in which fibers are conventionally made, including, without limitation, filament yarns, staple fibers, monofilament, and strands. Similarly, the full range of polyamide deniers and tensile properties can be achieved. The fibers can be textured, bulked, or crimped using well-known methods and can be colored using pigments or dyes. End-use applications for the fibers extend to all areas where polyamide fibers have been utilized, including, by way of example, apparel, carpets, rugs, upholstery, and industrial applications (tires, hoses, ropes, paper-making, felts, etc.).

MEASUREMENTS AND TEST METHODS

Amine and Carboxyl Ends are determined by the methods described on pages 293 and 294 in Volume 17 of the "Encyclopedia of Industrial Chemical Analysis" published by John Wiley & Sons (1973).

The relative viscosity (RV) of the polyamide is measured as described at col. 2, lines 42-51, in Jennings U.S. Pat. No. 4,702,875.

The gel-time or gelation time (reported in hours) is the time required to show a sharp inflection and rise in polymer melt viscosity while heating a polymer sample maintained at a constant temperature and a constant steam pressure of 1 atmosphere (760 mm). A plot of polymer melt viscosity versus time will show a rise or inflection in melt viscosity as formation of polymer gel makes the bulk polymer more viscous.

Denier of the yarn is measured according to ASTM Designation D-1907-80. Denier may be measured by means of automatic cut-and-weigh apparatus such as that described by Goodrich et al. in U.S. Pat. No. 4,084,434.

Tensile properties (Tenacity, Elongation at Break, Modulus) are measured as described by Li in U.S. Pat. No. 4,521,484 at col. 2, line 61 to col. 3, line 6.

Optical Clarity or Fiber Luster is a relative rating made while spinning a given polymer into yarn. The rating is made at the bottom of the quench zone, approximately 156 inches (3.96 m) below the spinneret, but before the the filaments are tightly packed into a threadline. The optical clarity is observed by shining a light at an angle of 35° above horizontal across the filaments which are traveling perpendicular to the floor. The intensity and clarity of the light reflected perpendicularly off the threadline is used to grade the quality of the fiber luster. A 0 to 10 scale is used. A 0 (zero) rating indicates poor luster and is characterized by virtually no reflection of light perpendicularly off the filaments. A 10 (ten) rating indicates excellent luster and is characterized by clear, intense light reflection off all the filaments.

The Dry Air Shrinkage was measured using a device which compares the surface speed of nip rolls used to keep the yarn under a constant tension before and after exposure to a radiant heat source. Specifically, the yarn to be tested is first conditioned at 60% relative humidity and 75° F. (29.4° C.) for a minimum of two hours. The conditioned yarn enters the device at an untensioned speed of 10 m/min., is tensioned by two pairs of nip rolls, the second of which has a surface speed, $L_1$ which is set to maintain a tension on the yarn of 0.15 g/denier. The yarn is then allowed to drop through a vertical, non-contacting radiant heater (45 inches (114 cm) long and having a 0.75 inch (1.9 cm) inner diameter) maintained at a temperature of 220° C. The yarn then passes through two more pairs of nip rolls which again tension the yarn to 0.15 g/denier via surface speed adjustments. This adjusted surface speed of the final pair of nip rolls, $L_2$, is used to calculate the Dry Air Shrinkage using the equation:

$$\text{Dry Air Shrinkage (\%)} = \frac{L_1 - L_2}{L_1} \times 100$$

Boil-Off Shrinkage (BOS) is measured according to the method in U.S. Pat. No. 3,772,872 column 3, line 49 to column 3 line 66, except that the yarn being measured remains in the bath of boiling water for twenty minutes, and its length is measured under 125 g tension.

Normalized Boil-Off Shrinkage compares the Boil-Off Shrinkage of a modified nylon 6,6 fiber with that of a nylon 6,6 homopolymer fiber, the Normalized Boil-Off Shrinkage being the percent increase in Boil-Off Shrinkage per total mole percent modification. As an illustration if the BOS of a nylon 6,6 homopolymer fiber is 5%, and that of a fiber having 96 mole % 6,6 units, 2 mole % amide units of Me5, and 2 mole % amide units of isophthalic acid is 9%, the increase in BOS=80%, and the Normalized BOS=20%/mole %.

Spherulite Level or Spherulite Rating is measured by reference to a set of controls. Yarn samples are embedded in wax, cross-sectioned and mounted on a glass slide. The wax is then dissolved in a xylene wash. The samples are then dried to leave the yarn cross-section slices on the glass slide. Three or four of the filament cross-sections are then examined by transmitted light with an optical microscope under crossed polarizers to determine the average spherulite rating for that yarn sample. The appearance of spherulites is similar to Maltese crosses. Filament cross-sections without spherulites have a spherulite rating of zero. Filament cross-sections which appear to be 50% spherulitic have a rating of 6, while filaments which are up to 50% spherulitic are rated linearly from 0 to 6. Filament cross-sections which appear to be 100% spherulitic have a rating of 10, while filaments which are between 50% and 100% spherulitic are rated linearly from 6 to 10. To obtain the spherulite level for a given polymer type, 3 to 8 of the yarn samples from that polymer base are rated, and the ratings are averaged together.

Dye Rate is measured by the procedure described in U.S. Pat. No. 4,919,874, column 3, line 30 through column 4, line 46.

Normalized Dye Rate compares the Dye Rate of a modified nylon 6,6 fiber with that of a nylon 6,6 homopolymer fiber, the Normalized Dye Rate being the percent increase in Dye Rate per total mole percent modification. As an illustration if the Dye Rate of a nylon 6,6 homopolymer fiber is 32, and that of a fiber having 96 mole % 6,6 units, 2 mole % amide units of Me5, and 2 mole % amide units of isophthalic acid is 48, the increase in Dye Rate=50%, and the Normalized Dye Rate=12.5%/mole %.

Melting Point is determined by Differential Scanning Calorimetry.

Drawability of a fiber is calculated by multiplying its Tenacity by the square root of its Elongation at Break.

Relative Drawability is the ratio of a given fiber's Drawability to that of a nylon 6,6 homopolymer fiber spun and drawn under the same conditions.

Draw Tension is the tension on a yarn as it is being drawn over a draw pin between a feed roll and a pair of heated draw rolls, the measurement being made on-line using a tensionometer at a point approximately 3 inches (7.5 cm) past the draw pin.

EXAMPLES

The following examples are offered for the purposes of illustrating the invention and are not intended to be limiting. Percentages are by weight except for the percentages of the amide-forming components which are in mole percent and where otherwise indicated.

Example I

Three terpolyamides of this invention were prepared as follows; an Me5/I salt solution was prepared by mixing 22.6 parts by weight Me5 in 45 parts water and then slowly adding 32.4 parts by weight isophthalic acid (I) to the aqueous solution of Me5, while continuing agitation. Like any acid/base reaction, this reaction was exothermic and cooling was needed to keep the temperature below 60° C. A clear solution with a faint yellow hue was obtained by this method. The pH of this salt solution was adjusted to 7.7. For Example I, a nylon 6,6 salt solution of about 52 weight percent concentration and balanced to a pH of 8.1 was used. The nylon 6,6 salt was charged to an evaporator and concentrated as described earlier. An antifoam and catalyst/antioxidant were added to the evaporator. Immediately after transferring the 6,6 salt solution from the evaporator to an autoclave, a sufficient amount of the Me5/I salt solution was charged to the autoclave to provide 22.0 parts by weight of the Me5/I salt (dry basis) for each 1000 parts by weight of nylon 6,6 salt (dry basis), thereby forming a combined salt solution having one mole percent Me5 and one mole percent isophthalic acid. The process was subsequently repeated using 44.9 parts and 69.0 parts by weight of Me5/I salt. In each case the reaction mixture was polymerized using the standard batch process used for making nylon 6,6. The polymer was extruded at the end of the reaction period and cut into flake after quenching with water. The properties of each 6,6/Me5/I terpolyamide are shown in Table I(a). When prepared under similar conditions, typical nylon 6,6 homopolymer has about 40 RV and 60–65 amine end equivalents/$10^6$ g polymer. The flake made from the three Me5/I terpolyamides of this invention had better optical clarity when compared with nylon 6,6 homopolymer flake, and the optical clarity improved with the increase in amount of Me5/I salt addition to the polymer.

Each flake so prepared was further polymerized in a solid phase polymerizer with a humidified inert gas above 150° C., then melted with an extruder. The melt was extruded through a spinneret, and the fiber thus produced was quenched, spun, drawn, and bulked to obtain trilobal yarns having a modification ratio of 2.3, 68 filaments per yarn bundle, and 1220–1230 total denier. The properties of such yarns are shown in Table I(b). In each case the fiber so produced had a lower spherulite rating, and better optical clarity (luster) than nylon 6,6 homopolymer fibers as will be discussed in detail in other examples.

Also, as shown in Table I(a), the polyamides of 6,6/Me5/I have also been found to form a "gel" substantially less readily than nylon 6,6 homopolymer when heated to the same temperature. (292° C. represents a typical processing temperature for nylon 6,6). From this example it can also be seen that the gelation time increases linearly with the percentage of amide units of Me5 and isophthalic acid. Thus, such polyamides exhibit both better optical clarity and longer gelation time.

Example II

This Example compares various 6,6/Me5/I terpolyamides with nylon 6,6 homopolymer and two 6,6 copolymers, 6,6/Me5 and 6,6/I, as shown in Table II(a). Using the batch procedures described previously, the copolyamide Controls C-2 and C-3 were prepared by making salts of isophthalic acid and Me5, balancing the monomers with hexamethylenediamine and adipic acid respectively. The four 6,6/Me5/I terpolyamides were prepared as in Example I, with the amount of Me5/I salt adjusted to provide the mole percentages of amide units of both Me5 and isophthalic acid as shown in Table II(a).

It can readily be seen that relative viscosity of the polymer decreases and $NH_2$ end levels increase with an increasing degree of nylon 6,6 modification. It can also be seen that the polyamides of the invention exhibit a lower melting point than both nylon 6,6 homopolymer and the copolymer controls. The last column of Table II(a) shows the melting point depression per mole percent of amide units modifying the nylon 6,6 polymer matrix. A larger impact on melting point depression is observed when the polymer is modified with both Me5 and isophthalic acid than that provided by either alone. Reducing the melting point allows the polymer to be processed at lower temperatures, thereby providing a further increase in the gelation time beyond the increase shown in Example I to be obtained even at constant temperature.

The polymers described above were then charged to a solid phase polymerizer to increase the degree of polymerization. Hot and humid gas was recirculated through a bed of flake under controlled conditions of flow, temperature, and humidity. The conditioned flake was fed to the extruder, where the flake was melted and pumped through a transfer line. A standard nylon 6,6 polymer temperature profile and melt viscosity (as measured by measuring the pressure drop in the transfer line) were used for spinning these polymers. The filaments were extruded from a spinneret at a temperature of 290° C., quenched by cool air (13° C.) blowing past the filaments at a rate of 370 ft³/min., and drawn 2.4 × over a draw pin based on the difference in surface speed between a feed roll having a surface speed of 1300 yards per minute and a pair of heated draw rolls rotating at a surface speed of 3120 yards per minute, the draw rolls being heated to a temperature of 192° C. The drawn fibers were then crimped and interlaced by impinging high velocity air heated to a temperature of 195° C. on the hot fibers. Two different cross-sectional shapes were evaluated with each of these polymers—trilobal (2.5 modification ratio) and 4-hole, square cross-section hollow filament. The trilobal yarn was 70 filament, 1150 total denier, while the hollow filament yarn was 82 filament, 1150 total denjer. Throughput rate for spinning the trilobal yarn was 5.2 g/minute/hole, while the rate for spinning the hollow filament yarn was 4.4 g/minute/hole.

Table II(b) summarizes the basic fiber properties of homopolymer nylon 6,6, copolyamides of 6,6/I, and 6,6/Me5, and various 6,6/Me5/I polyamides of this invention, the headings "T" and "H" being used here and in subsequent tables to designate the trilobal and hollow filament yarns respectively. In particular it can be seen that for both the trilobal and hollow filament yarns the optical clarity of the terpolyamides having amide units of Me5 is significantly better than that of both nylon 6,6 homopolymer and of the 6,6 copolymers modified with only Me5 or isophthalic acid.

The surprising shrinkage, dye rate and spherulite level of these same fibers is illustrated by the data in Table III(c). Dry air shrinkage levels are higher for these 6,6/Me5/I terpolyamide fibers than for any of the controls. The boil-off shrinkage for the 6,6 homopolymer fibers was measured as 4.2%. The normalized boil-off shrinkage represents the percent increase in boil-off shrinkage of the nylon 6,6 fiber per mole percent of modification to the nylon 6,6 polymer. It is clear that the 6,6/Me5/I polyamide fibers of the invention have significantly higher boil-off shrinkage than 6,6 homopolymer or the copolyamides, thereby indicating that greater increases in shrinkage are obtained by modifying the nylon 6,6, polymer with both Me5 and isophthalic acid than with comparable quantities of either alone.

Similarly, the dye-rate of 6,6 homopolymer fibers was measured as 31.4. The normalized dye rate was calculated for the other fibers listed in Table II(c), in an analogous manner to normalized boil-off shrinkage, as the percent increase in dye rate of a nylon 6,6 fiber per mole percent of modification to the nylon 6,6 polymer. The 6,6/Me5/I polyamide fibers are seen to be significantly higher in dye rate than those of 6,6 homopolymer or the copolyamides, again indicating that greater improvement can be obtained by incorporating amide units of both Me5 and isophthalic acid into the nylon 6,6 polymer than by adding comparable quantities of either alone. Thus, fibers of these terpolyamides show a synergistic effect on both shrinkage and dye rate compared to 6,6 copolyamide fibers made using the same monomers. This increase in dye rate provides opportunities for reducing the dye bath temperature leading to energy savings, for room temperature dyeable products, and for more complete exhaustion of dye liquor especially in continuous dyeing operations.

It is apparent that the 6,6/Me5/I terpolyamide is more effective in reducing the spherulite level of the fibers than the other polyamides compared in Table II(c). This again affirms the optical clarity differences observed earlier.

Example III

Example III relates to the formation of other polyamides and to the fibers formed from these polyamides. Flake properties of these polyamides are described in Table III(a). C-4 is a control polyamide, 6,6 nylon homopolymer, prepared by the conventional batch procedure discussed earlier. C-5 is also a control polyamide, a 3:6% copolymer of nylon 6,6 and terephthalic acid similarly prepared by batch polymerization. I-5 to I-8 are polyamides of this invention, having amide units of both Me5 and various other amide-forming monomers, including aromatic dicarboxylic acids, an aliphatic dicarboxylic acid, and an aromatic diamine.

The polyamides of Example III were prepared by employing the standard nylon 6,6 batch process, with a minor reduction in the final polymer temperature (about one degree C per weight percent of modification to the nylon 6,6 polymer) to aid casting by increasing the melt viscosity at the extrusion nozzle. More specifically, these polyamides were prepared by adding a salt solution of Me5 and one or more comonomers (other than adipic acid and hexamethylenediamine) to a hexamethylenediammonium adipate salt at a desired molar ratio to obtain the polymer composition described in Table III(a). For example, the polyamide I-5 was prepared by combining Me5 and terephthalic acid (T) to form an aqueous salt solution of about 50 wt % concentration and having a pH of 8.52, adding 40.3 parts by weight (dry basis) of the Me5/terephthalic acid salt to 1000 parts by weight (dry basis) of the hexamethylenediammonium adipate salt solution, and then polymerizing the mixture of these salt solutions by condensation polymerization.

It has been found that Me5 has a particular advantage over hexamethylenediamine in terms of solubility when used to form various salts. For example, the equimolar salt solution of terephthalic acid and hexamethylenediamine at 50 wt % concentration was pasty white even at 50°-60° C.; but by replacing hexamethylenediamine with Me5, a clear liquid solution at room temperature (~22° C.) is obtained. This also provides additional benefits such as ease of handling and lower degradation of salt due to lower storage temperature.

Similarly, a salt solution of Me5 balanced with an equimolar amount of a mixture of isophthalic acid and terephthalic acid (70/30 mole ratio), the solution having a pH of 7.4 and concentration of about 50 wt % was combined with hexamethylenediammonium adipate salt solution, again using 40.3 parts of the Me5 salt (dry basis) for every 1000 parts by weight (dry basis) of 6,6 salt, to make polymer I-6. For I-7, an equimolar salt of Me5 and dodecanedioic acid (DDDA) at ~50 wt % concentration and 8.3 pH was used, 41.2 parts by weight of the salt (dry basis) being added for each 1000 parts by weight of the nylon 6,6 salt (dry basis). For I-8, an equimolar mixture of Me5 and m-xylenediamine (MXD) in water was balanced with adipic acid (pH=7.7, and concentration ~50%) to form a clear salt solution at ~50°-60° C. that was immediately combined with nylon 6,6 salt solution at a ratio of 50.0 parts (dry basis) of the Me5 salt for each 1000 parts (dry basis) of hexamethylenediammonium adipate, the combined solution being polymerized by the standard condensation polymerization process.

The ter- and multipolymers so produced have significantly longer gel-times than the nylon 6,6 homopolymer C-4 or the terephthalic acid copolymer C-5. The improvement observed with the I-7 terpolymer, 6,6/Me5/DDDA, is typical—gel-time for this terpolymer was measured at 18.4 hours, compared to 15-16 hours for a nylon 6,6 homopolymer control such as C-4.

The relative viscosity, amine end levels, and melting points of these ter- and multipolymers are shown in Table III(a). Each of these polymers can be seen to have properties comparable to the 6,6/Me5/I polymers discussed in previous Examples. Each polyamide was subsequently further polymerized by a solid phase polymerization process, melted with a screw melter, and extruded through a spinneret under the same conditions as Example II to form both trilobal (70 filaments) and four-hole square hollow filament (82 filament) yarns with nominal total denier of 1150. The filaments were drawn, crimped, and interlaced as in Example II, except that the heated draw roll temperature was 210° C. and the air temperature used to crimp and interlace the yarn was 215° C.

The physical properties, relative viscosity and amine ends of the fibers so produced are given in Table III(b). An increase in yarn RV and decrease in amine end concentration shows that the polyamides of Example III can be effectively polymerized via the solid phase polymerization process. It is also apparent from the results given in Table III(b) that both tenacity and elongation at break of these polyamides exceed that of the nylon 6,6 homopolymer fibers. This is more apparent in terms of "relative drawability" given in Table III(b) for both the trilobal and hollow filament cross-sections. The drawability of a given fiber is defined as the product of its tenacity and the square root of its elongation at break. Relative drawability is the ratio of a given fiber's drawability to that of nylon 6,6. This property combines the measurement of fiber strength and the ability of the fiber to withstand a higher draw ratio without breaking as it goes through the drawing process. The fiber can therefore be drawn at the same draw ratio with fewer process breaks or can be drawn at a higher draw ratio to achieve a greater degree of orientation. These data indicate that the Me5 ter- and multipolymer fibers of this Example (as well as those of Example II—see Table II(b)) have a significantly better combination of strength and elongation than fibers spun from nylon 6,6.

As in previous Examples, the optical clarity of the terpolymer and multipolymer fibers of Example III is significantly better than that of nylon 6,6 fibers.

Other important fiber properties are given in Table III(c). It is again observed that these Me5·ter- and multipolyamide fibers exhibit improved shrinkage and dye properties, and that the ter- and multipolymers having Me5 amide units have significantly lower spherulite levels.

Example IV

This Example demonstrates that similar results are obtained by by co-melting various polyamides rather than by combining all the amide-forming materials prior to polymerization. The multipolyamide I-6 described previously in Example III is 6,6/Me5/I/T (96.4/1.8/1.3/0.5) prepared by adding all amide-forming components as monomeric salts prior to batch polymerization process. The multipolyamide I-9 contains the same amide units, but only Me5 was added prior to the batch polymerization step so that the flake formed was a 6,6/Me5 copolymer. The isophthalic acid and terephthalic acid moieties were added in the form of 6I/6T polyamide flake (commercially sold as "Selar PA" by E. I. du Pont de Nemours and Company). These two polyamide flakes were blended by the action of a screw type extruder, melted, and transported through a transfer line to the metering pump supplying the polymer to the spinning position. The hold-up time in the transfer line in the melt phase was about eight minutes at a temperature of 288° C. The melt was then extruded through spinnerets, quenched, drawn and bulked under identical conditions to Example III to form 70 filament trilobal and 82 filament four-hole square hollow filament yarns of 1150 nominal denier. The optical clarity of the fibers as observed during spinning was excellent.

Fiber tensile properties and relative drawability for fibers of polymer I-9 are shown in Table IV(a). When compared with 6,6 homopolymer (see Table III(b)), the fibers spun from multipolymer I-9 exhibit superior tenacity and elongation, and therefore increased relative drawability. Shrinkage, dye rate and spherulite levels are shown in Table IV(b). By comparing the fiber properties of I-9 with those of I-6, it can be seen that the changes in normalized BOS, normalized dye rate, and spherulite values as compared to nylon 6,6 are slightly less for this block multipolyamide than for the fibers spun from the random multipolyamide having the same amide units due to the "block" vs. random polyamide structure. If the hold-up time in the melt blending process is increased, the degree of randomization of the polymer will increase due to the amide exchange reaction which occurs, and the resulting fiber properties will approach those of polyamides produced by adding the Me5 and other amide-forming monomers before or during the initial polymerization step.

Example V

This Example further illustrates the formation of block polyamides and fibers having amide units of both Me5 and isophthalic and terephthalic acid. In this Example three different polymers having amide units of Me5 are co-melted in various quantities with nylon 6,6. These polymers, described as polymers A, B, and C, below have the following compositions, amine and carboxyl end levels and inherent viscosities (IV):

| Polymer | Mole Percentage | | | Amine Ends | Carboxyl Ends | IV. |
|---|---|---|---|---|---|---|
| | Me5 | I | T | | | |
| A | 50 | 50 | 0 | 48 | 87 | 0.54 |
| B | 50 | 25 | 25 | 38 | 42 | 0.80 |
| C | 50 | 35 | 15 | 32 | 43 | 0.76 |

For this Example a nylon 6,6 control polymer having a relative viscosity of about 42 was further polymerized by the solid phase polymerization process described earlier and melted at 288° C. in a screw melter, spun at 3.38 grams/minute/hole through a 68-hole spinneret into a quench chimney where a cooling gas is blown past the hot filaments at a flow rate of about 300 cubic feet per minute. The filaments were treated with a conventional spin finish, pulled by a feed roll rotating at a surface speed of 658 yards per minute (598 meters/min) and drawn at a 2.6 draw ratio using a pair of draw rolls heated at 190° C. After drawing, the heated, drawn yarns were crimped with a hot air (210° C.) jet-bulking process of the type described in U.S. Pat. No. 3,186,155, cooled on a rotating drum and wound on a yarn package. The nominal yarn denier was 1450.

Polymers A, B, and C were each then co-fed with the above-described nylon 6,6 control flake to the screw melter at levels of 10 and 20% by weight. In each case the polymers were melted at 288° C., and the hold-up time in the transfer line was about four minutes. In each case the combined molten polymer was then spun, drawn and crimped using the same conditions as for the homopolymer control. Spherulite levels of these fibers are shown in the table below.

| Fiber Composition (mole %) | Spherulite Level |
|---|---|
| 6,6 | 4 |
| 6,6(90.6)/Me5(4.7)/I(4.7) | 1 |
| 6,6(81.2)/Me5(9.4)/I(9.4) | 1 |
| 6,6(90.6)/Me5(4.7)/I(2.35)/T(2.35) | 2.5 |
| 6,6(81.2)/Me5(9.4)/I(4.7)/T(4.7) | 1 |
| 6,6(90.6)/Me5(4.7)/I(3.3)/T(1.4) | 2 |
| 6,6(81.2)/Me5(9.4)/I(6.6)/T(2.8) | 1 |

Example VI

For this Example a complex multipolymer having amide units of hexamethyleneadipamide, 2-methylpentamethylenediamine, dodecanedioic acid, nylon 6, 5-sodium sulfoisophthalic acid, and the branching agent tris(2-aminoethyl)amine was prepared. On a thousand pounds of polymer basis, the polymer was prepared by combining 1789 pounds of a 52 wt. % nylon 6,6 salt solution with 106.7 lbs. of a 44 wt. % salt solution formed from Me5, dodecanedioic acid and adipic acid, those three monomers being present in a 16.5:18:9.5 weight ratio; .28.3 lbs. of a 70 wt. % solution of -caprolactam; 15 lbs. of a 40 wt. % solution of the dimethyl ester of 5-sodium sulfoisophthalic acid and hexamethylenediamine, the two monomers being present in a 30:10 weight ratio; and 3.1 lbs. of a 50 wt. % solution of equal amounts by weight of tris(2-aminoethyl) amine and adipic acid. The combined salt solution was polymerized to flake using the same process conditions as previously described, and the resulting flake had a relative viscosity of 35.5 and an amine end level of 65.4 equivalents per $10^6$ g. The flake so produced had 94.6 amide units of hexamethylene-adipamide, 2.0 mole percent amide units of Me5, 1.1 mole percent amide units of dodecanedioic acid, 2.0 mole percent amide units of nylon 6, 0.2 mole percent amide units of 5-sodium sulfoisophthalic acid, and 0.07 mole percent amide units of tris(2-aminoethyl)amine.

Gel-time for this multipolymer was 17 hours, still longer than for nylon 6,6 homopolymer despite the presence of the branching agent which itself causes a reduction in gel-time.

The flake was further polymerized using solid phase polymerization, melted and spun through a spinneret at a throughput rate of 4.2 g/min./hole to form a 64 filament square hollow filament yarn. The freshly-spun yarn was quenched with an air flow of 370 ft$^3$/min. at 13° C., and drawn to 2.7 times its length using a feed roll with a surface speed of 1040 yards/minute and a pair of draw rolls turning at a surface speed of 2808 yards/minute, the draw rolls heated to a temperature of 203° C. The drawn yarns were then crimped and interlaced with hot (220° C.) air. The yarn so produced had a relative viscosity of 61.3 and amine end content of 48.3 equivalents per $10^6$ g. The spherulite level of the yarn was 0.5, and the dry air shrinkage and boil-off shrinkage were 2.60% and 5.0% respectively, compared with values of 2.45% and 4.1% for nylon 6,6 fibers spun and drawn under identical conditions. The relative drawability was 1.26 based on a drawability of 17.9 for a nylon 6,6 homopolymer yarn spun and drawn under the same conditions, indicating that the multipolymer yarn had good tensile properties. The draw tension, i.e. the tension measured on the yarn as it is drawn, increased to 0.97 g/denier from the 0.84 g/den level measured on a nylon 6,6 yarn spun and drawn under identical conditions. This increased draw tension indicates a yarn having greater structural stability.

TABLE 1

| Mole Percentage Nylon 6,6/Me5/I | NH$_2$ Ends (Eq./10$^6$ g) | Relative Viscosity | Gel Time at 292° C. (hrs) |
|---|---|---|---|
| 98.0/1.0/1.0 | 68.6 | 34.1 | 17 |
| 96.0/2.0/2.0 | 66.2 | 34.6 | 17.7 |
| 94.0/3.0/3.0 | 72.5 | 33.2 | 18.6 |
| Typical Nylon 6,6 Homopolymer | 60–65 | 40 | 15.2 |

| Mole Percentage Nylon 6,6/Me5/I | Denier | Rel. Visc. | NH$_2$ Ends (Eq./10$^6$ g) | Tenacity (g/den) | Elong. at Break (%) | Mod. (g/den) |
|---|---|---|---|---|---|---|
| 98/1.0/1.0 | 1220 | 79.8 | NA | 3.14 | 51.9 | 7.39 |
| 96/2.0/2.0 | 1231 | 69.9 | 39.6 | 3.13 | 51.7 | 7.37 |
| 94/3.0/3.0 | 1230 | 63.6 | 44.3 | 2.96 | 57 | 6.68 |

TABLE II(a)

| No. | Mole % (6,6/Me5/I) | Relative Viscosity | NH$_2$ Ends (Eq./10$^6$ g) | Melting Pt. (°C.) | Melting Point Depression (°C./mole % modification) |
|---|---|---|---|---|---|
| C-1 | 100/0/0 | 42.6 | 57.4 | 257.4 | |
| C-2 | 97.9/8/2.1* | 34.3 | 63.2 | 254.3 | 1.5 |
| C-3 | 97.2/2.8/0** | 35.8 | 60.2 | 255 | 0.9 |
| I-1 | 97.6/1.2/1.2 | 35 | 63.2 | 252.3 | 2.1 |
| I-2 | 96.4/1.8/1.8 | 31.6 | 67 | 249 | 2.3 |
| I-3 | 95.6/2.2/2.2 | 30.4 | 68.2 | 247.3 | 2.3 |
| I-4 | 94.0/3.0/3.0 | 28 | 71 | 244.2 | 2.2 |

*BALANCED WITH HEXAMETHYLENEDIAMINE
**BALANCED WITH ADIPIC ACID

TABLE II(b)

| | | FIBER PROPERTIES | | | | | | | |
|---|---|---|---|---|---|---|---|---|---|
| Polyamide (From Table II(a)) | Yarn RV | Yarn NH$_2$ Ends (Eq./10$^6$ g) | Tenacity (g/den.) | | Elongation at Break (%) | | Modulus (g/den) | | Optical Clarity |
| | | | T | H | T | H | T | H | |
| C-1 | 68.9 | 40.5 | 2.48 | 3.2 | 46 | 57 | 8.4 | 9.9 | 0.2 |
| C-2 | 65.9 | 35.2 | 3.05 | 3.5 | 49 | 59 | 9.6 | 10 | 5–7 |
| C-3 | 69.9 | 34.4 | 2.95 | 3.4 | 45 | 57 | 9.2 | 9.5 | 4–5 |
| I-1 | 63.9 | 45.6 | 2.93 | 3.4 | 50 | 63 | 8.9 | 9.1 | 8–9 |
| I-2 | 62.3 | 40.9 | 2.9 | 3.6 | 49 | 70 | 8.8 | 8.6 | 8–9 |
| I-3 | 61.5 | 39.2 | 2.86 | 3.3 | 46 | 57 | 9.1 | 9.4 | 8–10 |
| I-4 | NA | NA | NA | NA | NA | NA | NA | NA | 9–10 |

TABLE II(c)

| Polyamide (From Table II(a)) | Dry Air Shrinkage (%) | Normalized Boil-Off Shrinkage | Normalized Dye Rate | Spherulite Level |
|---|---|---|---|---|
| C-1 | 2.5 | 4.2* | 31.4* | 8 |
| C-2 | 2.5 | 3.3 | 7.3 | 3.8 |
| C-3 | 2.9 | 2.9 | 6.3 | 5.8 |
| I-1 | 3.4 | 9.3 | 28.7 | 3 |
| I-2 | NA | 11 | 31.9 | 2 |
| I-3 | 3.7 | 14.7 | 51.8 | 0.8 |
| I-4 | 4.1 | NA | NA | NA |

*Not normalized

TABLE III(a)

| | | FLAKE PROPERTIES | | | |
|---|---|---|---|---|---|
| No. | Polyamide Composition (Mole %) | Relative Viscosity | NH$_2$ Ends (Eq./10$^6$ g) | Melting Pt. (°C.) | Gel Time at 292° C. (hrs) |
| C-4 | 6,6(100) | 42.3 | 57.5 | 257.4 | 15.2 |
| C-5 | 6,6(96.4)/T(3.6) | 33.4 | 72.5 | N.A. | 15.7 |
| I-5 | 6,6(96.4)/Me5(1.8)/T(1.8) | 37 | 62.9 | 253.5 | 19.0 |
| I-6 | 6,6(96.4)/Me5(1.8)/I(1.3)/T(0.5) | 35.9 | 64.3 | 249.6 | 17.0 |
| I-7 | 6,6(97.0)/Me5(1.5)/DDDA(1.5) | 40 | 55.7 | 252.8 | 18.4 |
| I-8 | 6,6(97.6)/Me5(1.2)/MXD(1.2) | 40.2 | 58.2 | 253.3 | 18.2 |

TABLE III(b)

FIBER PROPERTIES OF EXAMPLE III

| Polyamide (From Table III(a)) | Yarn RV | Yarn NH$_2$ Ends (Eq./10$^6$ g) | Tenacity (g/den) T | Tenacity (g/den) H | Elong. at Break (%) T | Elong. at Break (%) H | Modulus (g/den) T | Modulus (g/den) H | Relative Drawability T | Relative Drawability H | Optical Clarity |
|---|---|---|---|---|---|---|---|---|---|---|---|
| C-4 | 65.3 | 39.8 | 2.78 | 3.30 | 49.6 | 59.7 | 8.22 | 8.83 | 1.00 | 1.00 | 0-2 |
| I-5 | 65.1 | 40.7 | 2.96 | 3.40 | 52.8 | 61.5 | 7.87 | 8.00 | 1.10 | 1.04 | 6-7 |
| I-6 | 61.5 | 44.7 | 2.98 | 3.55 | 57.7 | 69.7 | 7.95 | 8.11 | 1.16 | 1.16 | 7-9 |
| I-7 | 64.6 | 38.7 | 3.04 | 3.33 | 58.7 | 67.7 | 7.27 | 7.10 | 1.19 | 1.07 | 4-5 |
| I-8 | 62.2 | 41.2 | 3.02 | 3.38 | 52.2 | 62.8 | 7.97 | 7.92 | 1.11 | 1.04 | 5-7 |

TABLE III(c)

ADDITIONAL FIBER PROPERTIES OF EXAMPLE III

| Polyamide (From Table III(a)) | Dry Air Shrinkage (%) | Normalized BOS | Normalized Dye Rate | Spherulite Level |
|---|---|---|---|---|
| C-4 | 2.4 | 4.56* | 49.4* | 7 |
| I-5 | 1.9 | 2.4 | 23.9 | 0.9 |
| I-6 | 1.9 | 10.7 | 36.6 | 0 |
| I-7 | 2.6 | 8.3 | 48.3 | 2.9 |
| I-8 | 3.1 | 9.9 | 43.2 | 2.1 |

*Not normalized

TABLE IV(a)

FIBER PROPERTIES OF EXAMPLE IV

| No. | Polyamide Composition (Mole %) | Tenacity (g/den.) T | Tenacity (g/den.) H | Elong. at Break (%) T | Elong. at Break (%) H | Modulus (g/den) T | Modulus (g/den) H | Relative Drawability T | Relative Drawability H |
|---|---|---|---|---|---|---|---|---|---|
| I-9 | 6,6(96.8)/Me5(2.0)/I(0.8)/T(0.4) | 2.82 | 3.39 | 51.3 | 63.8 | 7.22 | 8.16 | 1.03 | 1.06 |

TABLE IV(b)

FIBER PROPERTIES OF EXAMPLE IV

| Polyamide From Table IV(a) | Dry Air Shrinkage (%) | Normalized BOS | Normalized Dye Rate | Spherulite Level |
|---|---|---|---|---|
| I-9 | 1.9 | 6.2 | 30 | 1.3 |

I claim:

1. A polyamide comprising between about 80 and about 99 mole percent hexamethyleneadipamide units and between about 0.5 and about 10 mole percent each of at least two other amide units, each of said other amide units being formed by the reaction of amide forming additives selected from the group consisting of dicarboxylic acids, diamines and lactams, one of said other amide units being formed by the reaction of 2-methylpentamethylenediamine with an amide forming additive selected from the group consisting of dicarboxylic acids and lactams.

2. A polyamide of claim 1 having between about 90 to about 99 mole percent hexamethyleneadipamtde units and between 0.5 and 5 mole percent each of the other amide units.

3. A polyamide of claim 2 wherein at least one of the other amide units is formed by the reaction of a dicarboxylic acid selected from the group consisting of isophthalic acid, terephthalic acid, 5-sulfoisophthalic acid and salts thereof, and dodecanedioic acid with an amide forming additive selected from the group consisting of diamines and lactams.

4. A polyamide of claim 3 wherein said dicarboxylic acid comprises isophthalic acid.

5. A polyamide of claim 3 wherein said dicarboxylic acid comprises terephthalic acid.

6. A polyamide of claim 3 wherein said dicarboxylic acid comprises a mixture of isophthalic acid and terephthalic acid.

7. A polyamide of claim 3 wherein said dicarboxylic acid is selected from the group consisting of 5-sulfoisophthalic acid and salts thereof.

8. A polyamide of claim 3 wherein said dicarboxylic acid comprises dodecanedioic acid.

9. A polyamide of claim 3 wherein at least one of the other amide units is formed by the reaction of an amide forming additive selected from the group consisting of diacids and lactams with m-xylenediamine.

10. A polyamide of claim 3 wherein at least one of the other amide units is formed by the reaction of ε-caprolactam with an amide forming additive selected from the group consisting of diamines and lactams.

11. A fiber of the polyamide of claim 1.

12. A fiber of the polyamide of claim 4.

* * * * *